(No Model.)
J. H. BARKER.
MANUFACTURE OF ROCK CANDY IN BARS OR STICKS.
No. 363,195. Patented May 17, 1887.
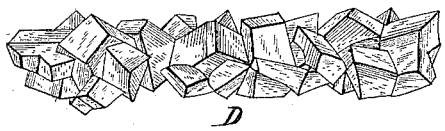
Fig: 1.
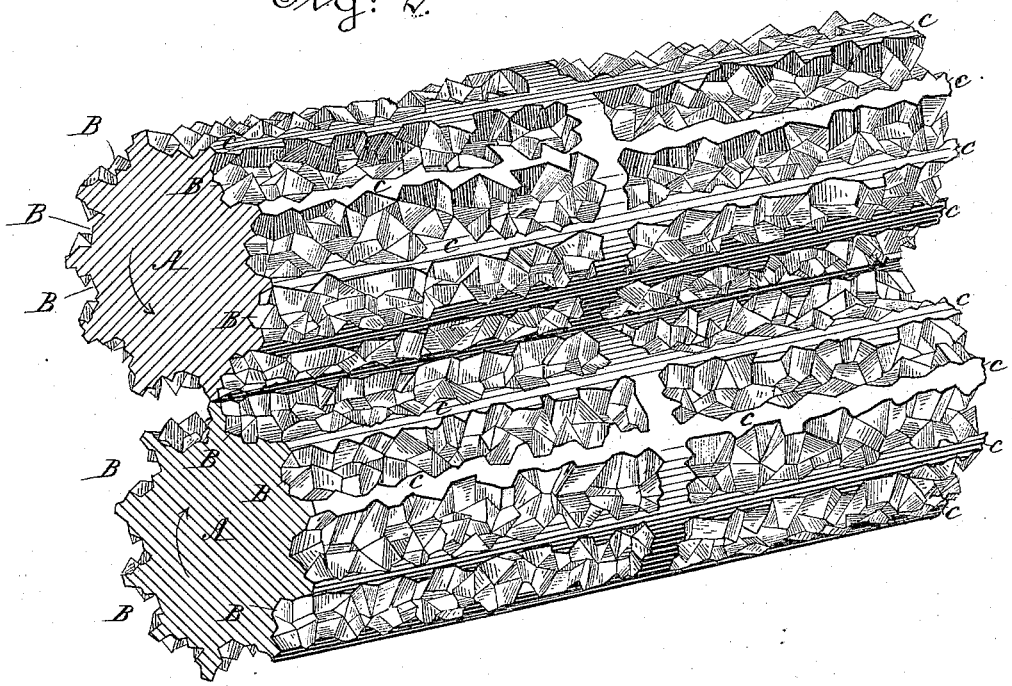
Fig: 2.
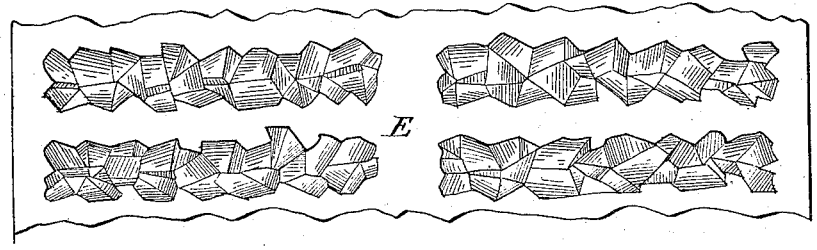
Fig: 3.
Witnesses:
John A. Rennie
S. A. Staves
Inventor,
Joseph Hainer Barker
By David A. Burr
Attorney

UNITED STATES PATENT OFFICE.

JOSEPH HAINES BARKER, OF NEW YORK, N. Y.

MANUFACTURE OF ROCK-CANDY IN BARS OR STICKS.

SPECIFICATION forming part of Letters Patent No. 363,195, dated May 17, 1887.

Application filed January 26, 1887. Serial No. 225,536. (No model.)

*To all whom it may concern:*

Be it known that I, JOSEPH HAINES BARKER, of the city, county, and State of New York, have invented certain new and useful Improvements in the Manufacture of Rock-Candy in Bars or Sticks; and I do hereby declare that the following is a full and exact description thereof, reference being had to the accompanying drawings, and to the letters of reference marked thereon, making a part of this specification, in which—

Figure 1 is an elevation of a stick of my improved coreless rock-candy; Fig. 2, a sectional elevation in perspective of a pair of the special rolls employed in the process of its manufacture, and Fig. 3 a plan view illustrating one of a pair of dies which may be employed as an equivalent for the rolls in said manufacture.

Heretofore the pure form of candy known as "rock-candy" has been obtained by melting sugar in hot water, bringing the solution to a boil until it has attained a density of about 40° Baumé, and then suspending in said solution cords or threads. As the solution cools the excess of saccharine matter therein is deposited in the form of crystals upon said cords or threads and upon the bottom and sides of the crystallizing-pan, constituting the rock-candy.

By this process only about fifty per cent. of the saccharine matter is converted into candy, the residue remaining in the pan in the form of a sirup, while of the rock-candy thus obtained a part only is in the superior form of sticks, the remainder, found upon the sides and bottom of the crystallizing-pan, being available only as lumps or broken pieces of irregular sizes and forms. Moreover, it is not possible to add flavoring matter to the rock-candy thus obtained, and the sticks necessarily contain the thread or central core upon which they are formed.

The object of my invention is to obtain sticks or bars of pure rock-candy substantially similar in essential characteristics and in outward appearance to those obtained by the process above described, and which shall be wholly free from a central core or other extraneous matter, and which may, if desired, be agreeably flavored, and to reduce the cost of manufacture, as well as to improve the quality of the rock-candy, by converting the entire amount of sugar into the candy without leaving any residual sirup. This object is attained by my invention as follows:

A solution of sugar in water is made of the same proportions and in the same manner as for the manufacture of rock-candy in the customary manner, the which, being well known to the art, need not be herein more fully described. This saccharine solution is then boiled until it has attained fully what is technically known as "the candy-point." When it has arrived at this point, it is poured upon a slab and manipulated until it is brought into the form of a plastic sheet, which, while still hot, is transferred thence to a pair of metallic shaping dies or rolls. These dies, in the form of rolls A A, are, as illustrated in Fig. 2 of the drawings, each formed with a series of longitudinal recesses B B sunken in the periphery thereof, preferably with the strips $c$ $c$ left between them, reduced to the narrowest possible limits, each recess B being so fashioned as to produce *in intaglio* the external crystalline formation found in a stick of rock-candy which has been produced by the crystallization of sugar upon a thread, as hereinbefore set forth, and to present thereby an exact counterpart of one longitudinal half of such a stick. Two corresponding dies or rolls thus systematically recessed are mounted so as to revolve in contact, (see Fig. 2,) the corresponding recesses in the one and the other being brought into exact registry, so that the narrow strips $c$ $c$ dividing and defining the recesses B B shall meet and close together, and when thus brought into opposition shall inclose between them a space or matrix which shall be the exact counterpart in all particulars as to form and size of the external configuration of a stick of rock-candy. The sheet of hot candy produced as above described is fed in between the pair of revolving dies or rolls, and, filling each matrix, will be thereby shaped into sticks of candy D, Fig. 1, which, upon cooling, will have not only the form and appearance of a stick of ordinary crystallized rock-candy, but will likewise have its quality and peculiarities without having any core, and with the further advantage, where this is desired, of having any such flavor as may have been imparted to the original solution.

By this process all waste is avoided and sticks of the most valuable grade of rock-candy, not only coreless, but flavored, are produced at a reduced cost.

It is evident that a pair of flat reciprocating dies, each substantially of the form shown at E, Fig. 3, and mounted to close in proper registry, may be used as an equivalent for the revolving dies or rolls B B.

I claim as my invention—

1. The new article of manufacture, consisting of a bar or stick in imitation of rock-candy, combining with the usual external crystalline configuration of the commercial rock-candy a solid cross-section free from any extraneous substance or core, substantially as herein set forth.

2. The within-described dies or rollers for the manufacture of an imitation rock-candy, arranged in pairs, which, in closing together, will inclose between them matrices each the counterpart of a crystalline formation, each matrix being produced by the registry of suitable intaglios formed in the opposed faces of the two dies or rollers, substantially as set forth.

3. The within-described corresponding dies for the manufacture of an imitation rock-candy, each having one or more intaglios formed therein whose configuration is the counterpart of a series of saccharine crystals, substantially as set forth.

In testimony whereof I have signed my name to this specification in the presence of two subscribing witnesses.

JOSEPH HAINES BARKER.

Witnesses:
S. A. STAVERS,
A. N. JESBERA.